United States Patent [19]
Seto

[11] Patent Number: 5,398,311
[45] Date of Patent: Mar. 14, 1995

[54] CHARACTER PROCESSING APPARATUS AND METHOD FOR PROCESSING CHARACTER DATA AS AN ARRAY OF COORDINATE POINTS OF CONTOUR LINES

[75] Inventor: Kunio Seto, Inagi, Japan

[73] Assignee: Canon Kabushiki Kaisha, Tokyo, Japan

[21] Appl. No.: 281,665

[22] Filed: Jul. 28, 1994

Related U.S. Application Data

[63] Continuation of Ser. No. 199,975, Feb. 22, 1994, abandoned, which is a continuation of Ser. No. 987,058, Dec. 7, 1992, abandoned, which is a continuation of Ser. No. 671,644, Mar. 20, 1991, abandoned, which is a continuation of Ser. No. 523,830, May 16, 1990, abandoned, which is a continuation of Ser. No. 156,590, Feb. 17, 1988, abandoned.

[30] Foreign Application Priority Data

Feb. 25, 1987 [JP] Japan ............... 62-043503
Feb. 25, 1987 [JP] Japan ............... 62-043511

[51] Int. Cl.$^6$ ............... G06F 15/62; G06F 15/66
[52] U.S. Cl. ............... 395/151; 395/150; 395/141; 395/139; 345/128; 345/143
[58] Field of Search ............... 395/151, 150, 141, 139, 395/143; 345/128-130, 141, 143, 144, 195; 382/22, 55

[56] References Cited

U.S. PATENT DOCUMENTS

| | | | |
|---|---|---|---|
| Re. 30,679 | 7/1981 | Evans et al. | 395/151 |
| 4,124,871 | 11/1978 | Morrin, II | 395/100 X |
| 4,408,198 | 10/1983 | Kudirka | 345/139 |
| 4,459,586 | 7/1984 | McVey | 345/143 |
| 4,517,604 | 5/1985 | Lasher et al. | 345/129 X |
| 4,573,199 | 2/1986 | Chen et al. | 345/142 X |
| 4,675,830 | 6/1987 | Hawkins | 395/151 X |
| 4,817,172 | 3/1989 | Cho | 395/139 X |
| 4,833,627 | 5/1989 | Leszczynski | 395/145 |
| 4,837,847 | 6/1989 | Shirasaka et al. | 382/55 |
| 4,907,282 | 3/1990 | Daly et al. | 395/150 X |
| 4,959,801 | 9/1990 | Apley et al. | 395/150 |
| 5,304,988 | 4/1994 | Seto | 345/141 |

*Primary Examiner*—Raymond J. Bayerl
*Attorney, Agent, or Firm*—Fitzpatrick, Cella, Harper & Scinto

[57] ABSTRACT

A character processing apparatus which has character data as a coordinate point array on contour lines and converts the character data into dot information and outputs. This apparatus includes: a discriminating circuit to discriminate whether two continuous points in the coordinate point array constitute horizontal or vertical line elements on the basis of the coordinate values between the two points; and an arithmetic operating device which, when it is determined that those two points constitute a horizontal or vertical line, enlarges or reduces a thickness of this horizontal or vertical line so that the relation of thickness of the horizontal and vertical lines is equal to the relation of thickness in the character data. The discriminating circuit performs the discrimination before the character data is converted into the dot information. The arithmetic operations are independently performed in accordance with a designated size with respect to the coordinate points indicative of a main outer shape of a character and to the coordinate points representative of an additional outer shape. With this apparatus, the horizontal and vertical lines can be output with a high quality with various sizes.

36 Claims, 6 Drawing Sheets

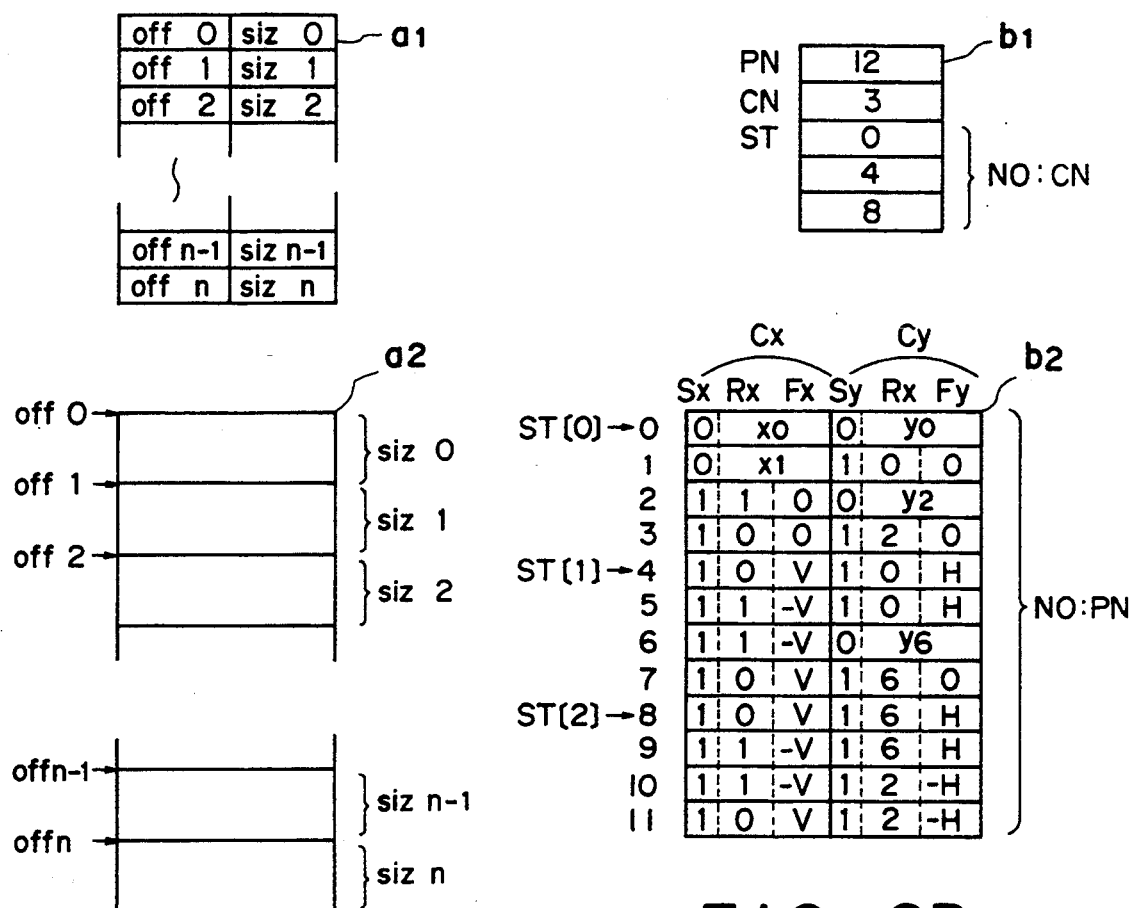
FIG. 2A
FIG. 2B
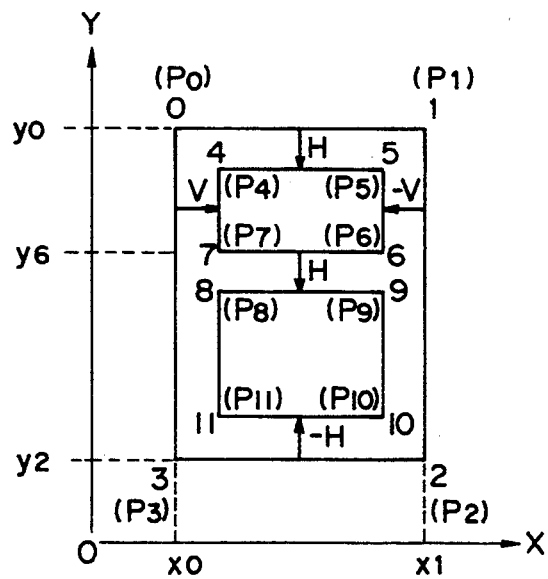
FIG. 2C

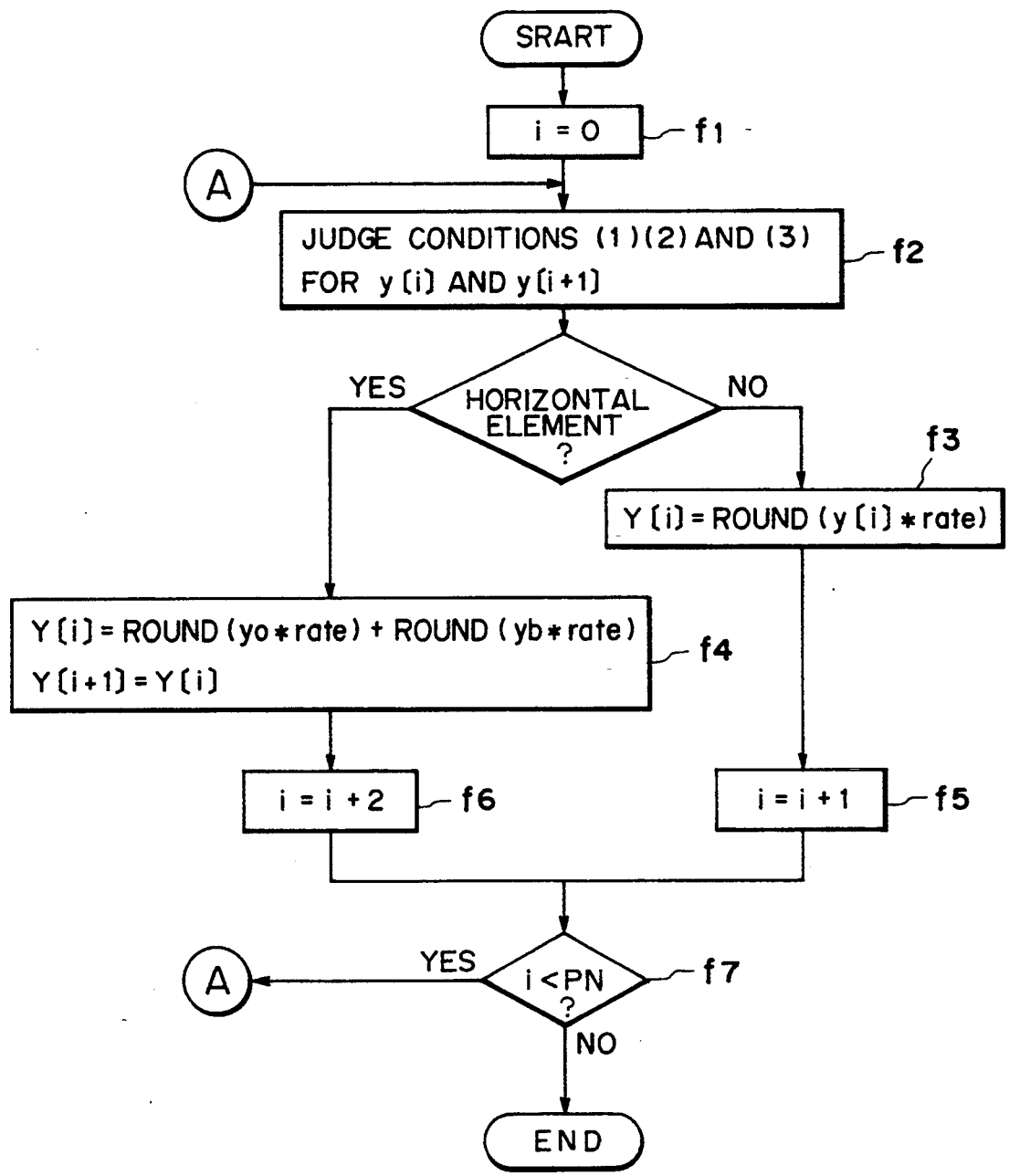
F I G. 5

CHARACTER PROCESSING APPARATUS AND METHOD FOR PROCESSING CHARACTER DATA AS AN ARRAY OF COORDINATE POINTS OF CONTOUR LINES

This application is a continuation of application Ser. No. 08/199,975, filed Feb. 22, 1994, now abandoned, which is a continuation of application Ser. No. 07/987,058, filed Dec. 7, 1992, now abandoned, which is a continuation of application Ser. No. 07/671,644, filed Mar. 20, 1991, now abandoned, which is a continuation of application Ser. No. 07/523,830, filed May 16, 1990, now abandoned, which is a continuation of application Ser. No. 07/156,590, filed Feb. 17, 1988, which is now abandoned.

BACKGROUND OF THE INVENTION

1. Field of the Invention

The present invention relates to a character processing apparatus which can output characters in designated sizes.

2. Related Background Art

Character processing apparatus have been developed which store character data in a ROM (read only memory) or an external storage device and outputs characters. In one such apparatus various kinds of characters in different character sizes to obtain outline effect, emphasis effect, and the like can be output to a display device, printer, or the like from a middle size to a large size with a data memory of a small capacity to output characters having a relatively high quality. In one practical embodiment of this character processing apparatus reference character data is stored as a coordinate point array on contours and the coordinate points are enlarged or reduced in accordance with the designated output size and thereafter, they are converted into dot information and output.

However, according to such a conventional apparatus, the reference character data is stored as absolute coordinate values of the coordinate points on contours and these coordinate values are merely multiplied by the enlargement rate or reduction rate according to the designated output size, thereby obtaining the final coordinates. Therefore, due to a digitization error which is caused when the coordinate values are made to correspond to the lattice points of the final output size, as shown in FIG. 4A, a variation occurs in horizontal or vertical line thicknesses, which should inherently be uniform. Particularly, when a character is converted into the character of a small size, there is a problem such that the apparent quality deteriorates remarkably.

On the other hand, in a character processing apparatus which has character data in an ROM or external storage device and outputs characters, there are many demands in recent years to output characters of a plurality of sizes in order to obtain an outline effect, an emphasis effect, or the like. To meet these demands, the following methods are used.

(1) All of the fundamental character data of the necessary sizes are stored as dot information in accordance with the resolutions of output devices (dot printer and the like). (For example, characters of 16×16 dots, 24×24 dots, 32×32 dots, etc.)

(2) The fundamental dot information is variably magnified and output.

(3) Character data is stored as a coordinate point array on contours. After this character data was enlarged or reduced in accordance with the designated output size, it is converted into the dot information and output.

(4) The above methods (1) to (3) are combined and the like.

However, the foregoing methods have the following problems in the conventional apparatuses.

a) According to the method of (1), the amount of character data is large. The cost is high. The character sizes which can be output are limited to the dot sizes of character data (e.g., 16×16, 24×24, 32×32, etc.). When character data is output by a printer of a high resolution, the dot size must be also enlarged in proportion to the high resolution.

b) According to the method of (2), the quality of the enlarged or reduced output character remarkably deteriorates due to the variable magnification. The variable magnification range is also limited.

c) According to the method of (3), although the drawbacks in the above items a) and b) can be eliminated, when character data is variably magnified (reduced) to output a character of a relatively small size, the ratio of error which is caused as the result of the arithmetic operation of the coordinate values increases. As shown in FIG. 4A, the thicknesses of horizontal or vertical lines, which should inherently be uniform, do not become uniform, so that the quality deteriorates.

d) According to the method of (4), to eliminate the drawback of the above item c), dot data is output for a character of a small size and a character is output by the method of (3) for a character of a large size. However, the drawback in each method still remains.

Techniques regarding the outline font technique in which character data is stored as a coordinate point array on contour lines are disclosed in U.S. application Ser. No. 854,193 filed on Apr. 21, 1986, which issued as U.S. Pat. No. 4,817,172 on Mar. 28, 1989, U.S. application Ser. No. 596,737 filed on Aug. 22, 1990, now abandoned, and U.S. application Ser. No. 819,650 filed on Jan. 10, 1992, all of which have been assigned to the same assignee as this invention. Although these techniques are technically quite different from the present invention, they are concerned with the present invention with respect to a large concept of the outline font. According to those U.S. Patent disclosures, there are provided: the technique to independently thicken or thin in the vertical or lateral direction; the technique to uniformly thicken or thin; the technique for modification (shadow, hatching, or the like) of outline fonts; the technique to prevent the paint-out in the process to thin a contour or to realize notches of a generation pattern; and the like.

On the other hand, although the following techniques are also technically quite different from the present invention, U.S. Pat. No. Re. 30,679 has proposed techniques for variable magnification of outline fonts and for painting-out, and U.S. Pat. No. 4,408,198 (Kudirka) has proposed the technique to modify a pattern by the delay of every scan line in a video character generator, and the like.

SUMMARY OF THE INVENTION

In consideration of the foregoing problems, it is an object of the present invention to eliminate the foregoing drawbacks.

Another object of the invention is to provide a character processing apparatus in which reference character data is stored as coordinate point information on contours and which is provided arithmetic operating means in which when the coordinate point information is enlarged or reduced in accordance with designated output sizes, the coordinate point information indicative of the main outer shape is first subject to arithmetic operations for enlargement or reduction by using the coordinate value information as the absolute values, and for the coordinate point information representative of the additional outer shape, a relative distance is subject to arithmetic operations for enlargement or reduction and added to the coordinate values of the relating coordinate points which have already been arithmetically operated on, and due to this, even after completion of the arithmetic operations for enlargement or reduction, characters can be output with a high quality with character sizes of a wide range without deteriorating the quality with which the characters are output.

Still another object of the invention is to provide a character processing apparatus in which character data is stored as a coordinate point array on contour lines, when coordinate points are enlarged or reduced in accordance with the designated output sizes, a check is made to see if continuous two points in the coordinate point array constitute horizontal or vertical line elements or not, and if it is determined that they constitute a horizontal or vertical line as the result of the discrimination, the relation of thickness of this horizontal or vertical line is enlarged or reduced so as to be equal to the relation of thickness in reference character data, so that even after completion of the enlargement or reduction, the horizontal and vertical lines of uniform thicknesses can be output, and characters from small to large sizes can be output with a high quality by the minimum data amount.

Still another object of the invention is to provide a character processing apparatus in which character data is stored as a coordinate point array on contour lines, by subjecting coordinate points to arithmetic operations in accordance with the designated output sizes or in accordance with whether these points constitute a horizontal or vertical line or not, characters can be output with a high quality.

Still another object of the invention is to provide a character processing apparatus in which character data is stored as a coordinate point array on contour lines, by subjecting coordinate values to arithmetic operations indicative of a main outer shape and an additional outer shape of a character individually in accordance with the designated output sizes, the character can be output with a high quality.

BRIEF DESCRIPTION OF THE DRAWINGS

FIGS. 2A to 2E are diagrams for explaining the case of storing reference character data;

FIG. 5 is a processing flowchart for discriminating horizontal or vertical elements and performing an arithmetic operation for enlargement or reduction of character data.

DETAILED DESCRIPTION OF THE PREFERRED EMBODIMENTS

An embodiment of the present invention will be described in detail hereinbelow with reference to the drawings.

Figure 1:
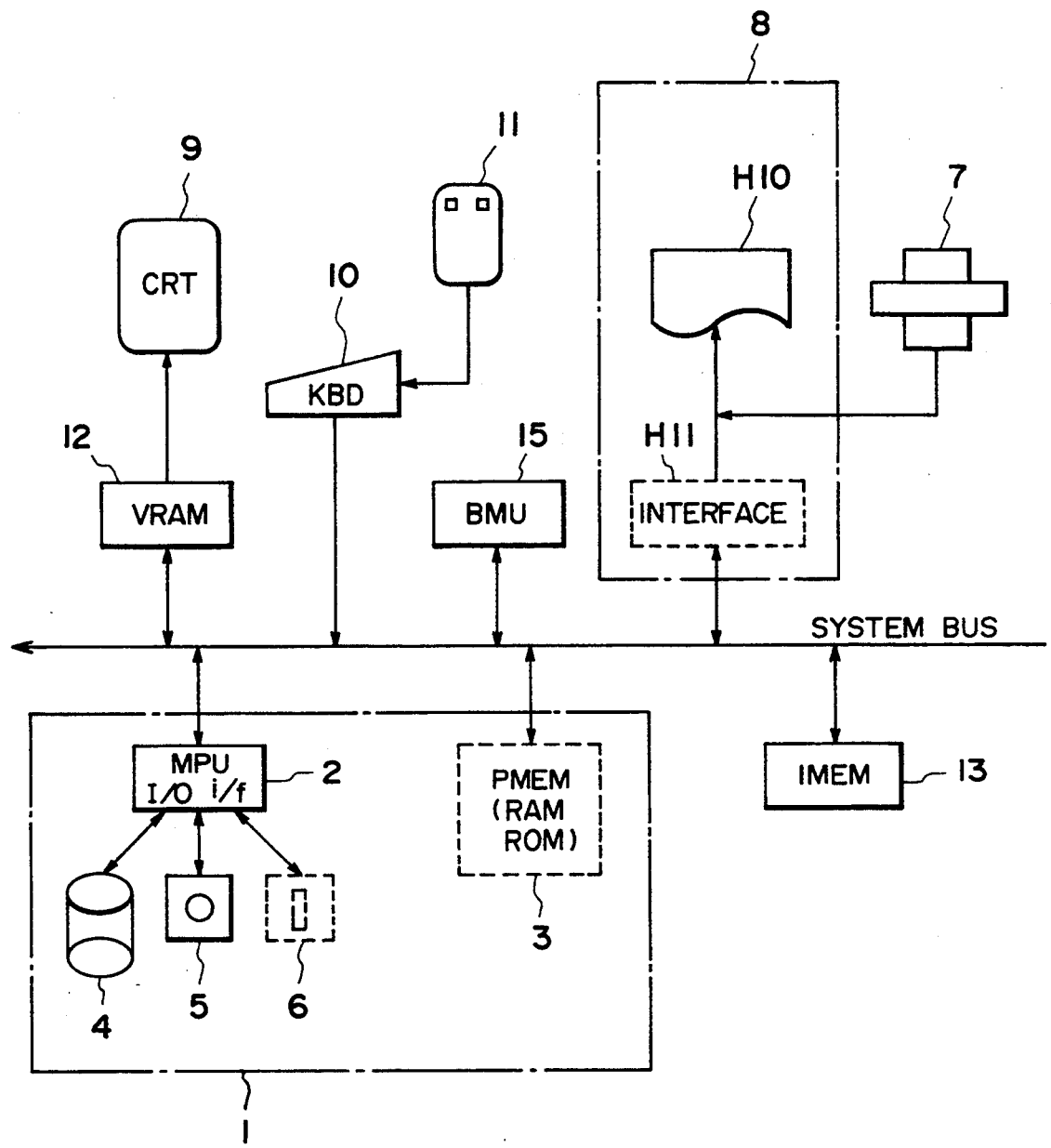
FIG. 1 is a block diagram of a character processing apparatus according to an embodiment of the present invention.

FIG. 1 is a block diagram of a character processing apparatus to which the invention is applied. Obviously, the invention can be also applied to both cases where the apparatus of the invention is a single apparatus or where it is constituted as a system.

Reference numeral 1 denotes a control section of the apparatus. The control section 1 comprises: a microcomputer (MPU) 2; an internal memory 3 consisting of an RAM (random access memory), an ROM (read only memory), and the like; and an external memory consisting of a hard disk 4, a floppy disk 5, a cartridge disk 6, or the like.

Numeral 7 denotes an original reader serving as an image input section for reading an original image put on an original plate and converting the original image into an electric signal by an image pickup device such as a CCD or the like.

Numeral 8 denotes a high speed printer (H10) such as a laser beam printer or the like serving as an image output section for recording an image onto a recording medium on the basis of the information in the form of the electric signal.

Numeral 9 denotes a CRT display device to display control information or the like of the apparatus. The CRT 9 serves as an image processing display section of the invention.

Numeral 10 denotes a keyboard provided for the control section 1. By operating the keyboard 10, the operation of the apparatus is instructed or the like. A pointing device 11 is used to indicate and process image information on the CRT 9. By arbitrarily moving a cursor on the CRT 9 in the X and Y directions and selecting a command image on a command menu, a proper command is instructed. Data to be displayed on the CRT 9 is developed on a bit map in a VRAM 12. For example, in the case of character data, the character image information corresponding to the code is developed in the VRAM 12.

Numeral 3 denotes the program memory (PMEM) for properly selecting and executing a processing program for editing or a processing program in an arithmetic operating section, which will be explained hereinlater, from the hard disk 4. The data which was input and arithmetically operated on by the apparatus can be developed in an image memory (IMEM) 13 and is output from the output section 8.

Numeral 15 denotes a bit manipulation unit (BMU) which can perform the DMA transfer such that data can be transferred among the VRAM 12, PMEM 3, and IMEM 13 without passing through the CPU. The BMU 15 performs logic arithmetic operations on a bit unit basis when data is transferred, for rotation, variable magnification, or the like of a developed figure.

FIG. 2 is a diagram showing the content of reference character data stored in the external storage device 5 in FIG. 1. FIG. 2A is a diagram showing a constitution of character data consisting an index section $a_1$ to record an offset from the head of the actual data storage area and a data length and an actual data section $a_2$ in order to read the necessary data from a plurality of fundamental character data in accordance with the code designated by the keyboard 10 and mouse 11. FIG. 2B is a diagram showing the content of the character data which was read out on the basis of the designated code in the data section $a_2$. This character data consists of a header section $b_1$ and a coordinate value data $b_2$. The contents of the sections $b_1$ and $b_2$ will now be described with respect to the case of storing a simple character or figure in FIG. 2C.

A character pattern " " in FIG. 2C is expressed by a dot train 0, 1, 2, ..., 10, 11 ($P_0, P_1, P_2, ..., P_{11}$ ($P_i$=x[i], y[i])) on the contour lines in the x/y coordinate system in which the coordinate origin is 0. In this case, the number PN of coordinate points in the section $b_1$ is set to 12, the total number CN of contours is set to 3, and contour start point tables ST [0]=0, ST [1]=4, and ST [2]=8. The sizes of these tables are specified by the CN. The section $b_2$ denotes the data array indicative of the coordinate values of the dot train 0, 1, 2, ..., 10, and 11 ($P_0, P_1, ..., P_{11}$) on the contours of the pattern shown in FIG. 2C.

In the pattern shown in FIG. 2C, three horizontal lines and four (as explained below) vertical lines exist. Assuming that the absolute values of the widths of the horizontal and vertical lines are set to H and V, respectively, for example, the horizontal line 4-5 has the Y direction difference H from another horizontal line 0-1 serving as a reference line. The vertical line 9-10 has the X direction difference −V from another vertical line 1-2 serving as a reference line. The reference lines and their additional lines are determined on the basis of whether they represent the outer shape of this pattern or not.

Figure 2D:
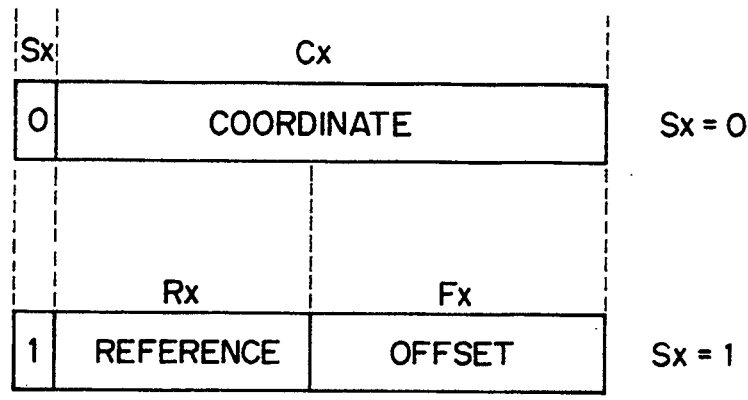

FIG. 2D is a diagram for explaining one of the arrays $b_2$ in FIG. 2B with respect to the x coordinate. This data has the width of sixteen bits and the most significant bit $S_x$ is recorded as bit 0 when the x coordinate value of this point indicates the outer shape as a reference. The bit $S_x$ is recorded as bit 1 when the x coordinate value of the point represents the additional outer shape. When Sx=0, a distance from the coordinate origin in (c) is recorded as the other bits Cx. When Sx=1, seven bits of Rx in (c) represent the value indicative of the position of the array at which the reference coordinates to which the point is referred are recorded. Eight bits of Fx indicate the relative distance from the reference coordinates which has been referred as mentioned above. In the case of the embodiment, $-16384 \leq Cx \leq 16383$, $0 \leq Rx \leq 127$, and $-128 \leq Fx \leq 127$.

An explanation will now be provided with respect to the control section 1 for enlarging or reducing the reference character data stored in the external storage device 5 in FIG. 1 in accordance with the output size designated by the keyboard 10 and mouse 11 and for recording the result in the arithmetic operating section.

Figure 3:
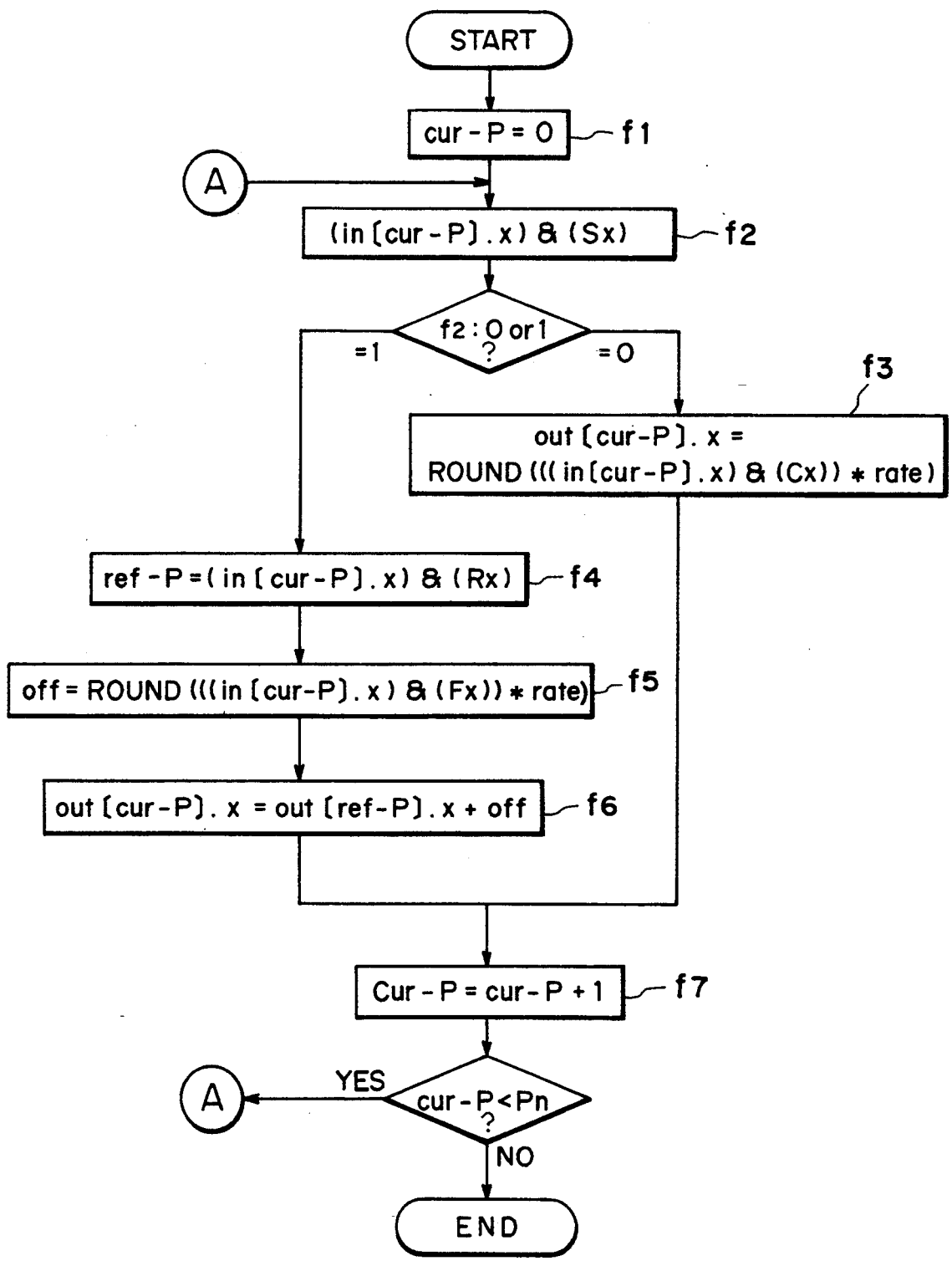
FIG. 3 a processing flowchart showing the operation of a control section 1.

FIG. 3 is a flowchart for explaining the operation of the control section 1. This flowchart is limited to the x coordinate value for simplicity of explanation. Since the y coordinate value is also obtained by performing similar arithmetic operations, a flowchart for the y coordinate value is omitted here. An operator [ ] denotes that, in the case of A [B], the content at the position B of the array A is fetched. An operator · denotes that, in the case of A·B, the content of the component B which belongs to the data A is fetched. An operator & denotes that, in the case of A & B, the AND of the data A and the bit mask B is calculated and only the number of effective bits of B is set to the result.

An array "n" denotes fundamental data stored in the external storage device 5 in FIG. 1. An array "out" denotes an array stored in the IMEM 13 in FIG. 1 and stores the output data as the result of the arithmetic operations. "cur-p" denotes a repetitive control variable. "rate" denotes a variable magnification parameter to convert character data into data of the size designated by the keyboard 10 and mouse 11 in FIG. 1. ROUND(x) denotes an optimum digitizing means for projecting the result of the arithmetic operation on x to the digital data in the output area and indicates an integer transformation by, e.g., a method of counting fractions of 0.5 and over as a unit and cutting away the rest. SX, RX, FX, and CX represent constant masks indicative of bit masks Sx, Rx, Fx, and Cx in FIG. 2B, respectively.

In FIG. 3, the repetitive control variable "cur-p" is first set to 0 in step f1.

In the next step f2, a check is made to see if the Sx bit has been set in the present data or not. If NO, the process in step f3 is executed. Namely, the value of the AND of the Sx and the coordinate value portion mask Cx is merely subjected to the arithmetic operation for enlargement and reduction and the resultant data is stored into the array "out". If the Sx bit has been set, this coordinate value indicates the additional outer shape of the relevant character. Namely, in step f4, the present data is first applied to the Rx mask and the positions on the array of the coordinate points indicative of the main outer shape to be referred by the coordinate points are obtained and temporarily stored in the "ref-p". In the next step f5, the present data is applied the Fx mask and the relative distances from the coordinate points indicative of the main outer shape are obtained and subjected to the arithmetic operation for enlargement or reduction, and the resultant data is temporarily stored in the "off". These data are added in step f6 and stored into the array "out". In this flowchart, in the out[ref-p]x in step f6, the arithmetic operations in step f3 must have already been executed and specified. Namely, the coordinate points representative of the main outer shape must be located earlier in the array than the coordinate points indicative of the additional outer shape. Therefore, it is sufficient to set such that the coordinate values indicative of the coordinate points on the contour lines satisfy this condition or to logically satisfy it (for example, only when the Sx bit is 0 in step f2, all of the arithmetic operations are precedingly executed).

Figure 4A:
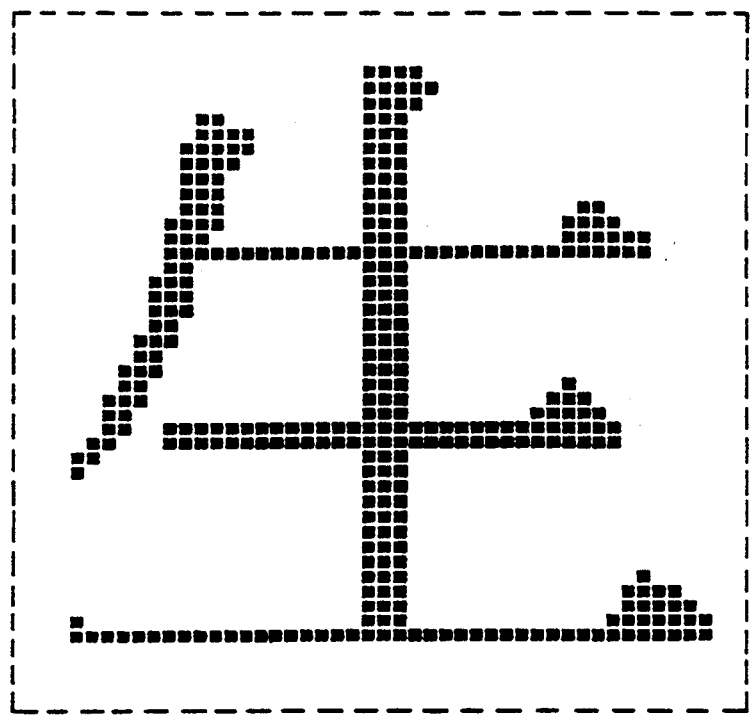
FIGS. 4A and 4B are diagrams showing output examples of " " (which is pronounced as "SEI" and means "LIFE") by a conventional apparatus and by a character processing apparatus according to the invention, respectively.
Figure 4B:
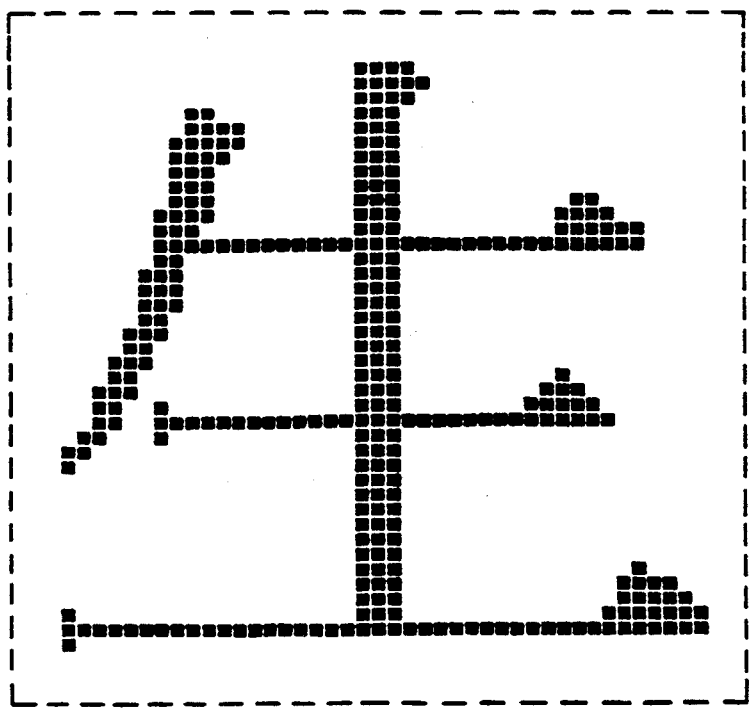

FIG. 4B illustrates a simple output example of the actual character " " according to the invention.

All of the values of FX in the flow of FIG. 3, namely, the offset values of the contour points indicative of the additional outer shape can be uniform or can be limited to a few kinds of values in the system to embody the present invention (for example, all of the thicknesses of horizontal lines of MING-style characters are almost uniform in the same fonts), so that they can be uniformly arithmetically operated on when the enlargement or reduction rate is decided.

Therefore, if the variable "off" is previously arithmetically operated on outside of the flow of FIG. 3, the number of arithmetic operations can be further reduced.

As described above, in the character processing apparatus in the invention, the thickness of horizontal or vertical lines whose variation could not be controlled in the conventional apparatus can be made uniform. Even after completion of the arithmetic operations for enlargement or reduction, characters can be output without deteriorating the quality thereof.

A method whereby a check is made in the MPU 2 in FIG. 1 to see if the coordinate points constitute the horizontal or vertical line elements or not will now be explained.

In the pattern shown in FIG. 2C, three horizontal lines and four vertical lines exist. Namely, the horizontal lines are constituted by the combinations of the following two corresponding line segments.

$P_0P_1$ and $P_4P_5$
$P_6P_7$ and $P_8P_9$
$P_2P_3$ and $P_{10}P_{11}$

The vertical lines are also constituted by the combinations of the following two corresponding line segments, respectively.

Figure 2E:
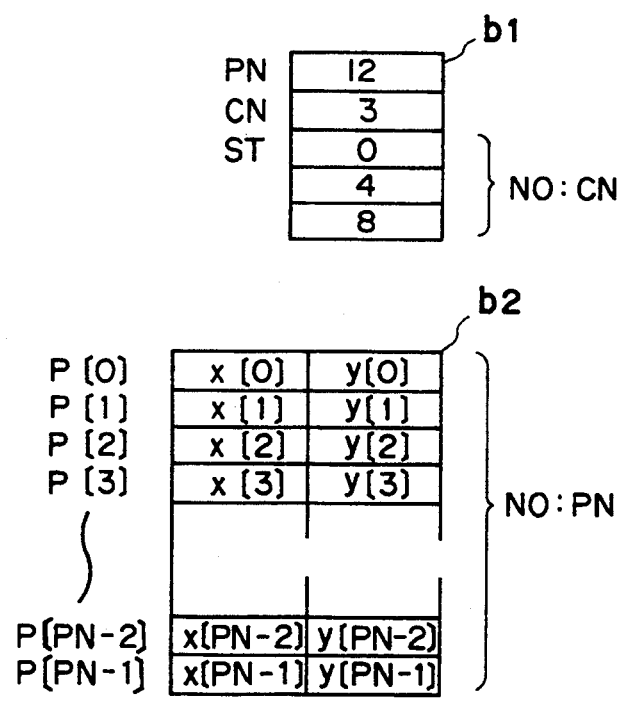

$P_3P_0$ and $P_7P_4$
$P_3P_0$ and $P_{11}P_8$
$P_5P_6$ and $P_1P_2$
$P_9P_{10}$ and $P_1P_2$ In order to automatically discriminate the horizontal or vertical line elements from the coordinate value data array as shown in FIG. 2E (similar to FIG. 2C), it is sufficient to seek the line segments which satisfy the following conditions from two sets of line segments $P_{00}P_{01}$ and $P_{10}P_{11}$ consisting of two adjacent points, wherein $P_{00}=(x_{00}, y_{00})$, $P_{01}=(x_{01}, y_{01})$, $P_{10}=(x_{10}, y_{10})$, and $P_{11}=(x_{11}, y_{11})$. The discriminating process for the horizontal line elements will now be described hereinbelow. For the vertical line elements, it is sufficient to replace x and y in each of the following items.

FIG. 5 shows a flowchart for the processes by the MPU 2.

"PN" denotes the number of coordinate points shown in FIG. 2E and "i" represents a control variable to repetitively execute the arithmetic operations for all of the coordinate points within a range of $0 \leq i < PN$.

y[i] denotes a coordinate value array as a reference which is temporarily been stored in the external storage device 5. Y[i] indicates a coordinate value array in a memory to store the result of the arithmetic operations in the processes.

In the first step f1, "i" is set to 0 and the process in step f2 is executed. The step f2 corresponds to the process to discriminate the following conditions (1), (2), and (3).

It is now assumed that the y coordinate values of $P_{00}$, $P_{01}$, $P_{10}$, and $P_{11}$ are y[i], y[i+1], y[n], and y[n+1] (wherein, $j \neq n$ and $0 \leq n < P_{n-1}$). In this state, a check is made to see if n which satisfies the following three conditions exists or not.

Condition (1)

Both y coordinate values are the same with respect to the two line segments $P_{00}P_{01}$ and $P_{10}P_{11}$. Namely, $y_{00}=y_{01}$ ($=y_0$) and $y_{10}=y_{11}$ ($=y_1$).

Condition (2)

In the condition (1), the distances of the y coordinate values $y_0$ and $y_1$ fall within a certain constant range. Namely, when $y_b=y_1-y_0$, $y_{b0} \geq y_b \geq y_{b1}$. $y_{b0}$ and $y_{b1}$ fall within a range of the horizontal line thickness of the reference character data and they are set to peculiar values in a series of character sets (fonts) with the same design.

Condition (3)

In the condition (1), assuming that $minx_0 = min(x_{00}, x_{01})$, $maxx_0 = max(x_{00}, x_{01})$, $minx_1 = min(x_{10}, x_{11})$, $maxx_1 = max(x_{10}, x_{11})$, $maxx_0 < minx_1$ and $minx_1 < maxx_1$.

Where, min (a, b) denotes a function to obtain the smaller value between the values a and b and max (a, b) indicates a function to obtain the larger value between the values a and b.

By the foregoing conditions (1) to (3), after the MPU 2 in FIG. 1 discriminated the horizontal or vertical line elements, the enlargement or reduction is performed. The processes in steps f3 and f4 in FIG. 5 will be described hereinbelow.

(i) When the present y coordinate value y[i] is not the horizontal line element, in steps f3 and f5 in FIG. 5, Y[i]=ROUND (y[i]*rate) i=i+1

(ii) When the present y coordinate value y[i] is the horizontal line element, namely, when y[i]=$y_1$ and the y coordinate value y[n] of the corresponding $y_b=y_1-y_0$ constituting the horizontal line has already been specified, in steps f4 and f6 in FIG. 5, Y[i]=ROUND (y[i]*rate)+ROUND ($y_b$*rate) On the other hand, from the condition (1), Y[i+1]=Y[i] [i=i+2 where, "rate" denotes an enlargement rate or reduction rate, i.e., (designated output size)/(fundamental data size). "ROUND" denotes an optimum integer converting means for digitizing the result of the arithmetic operation, for example, a method of counting fractions of 0.5 and over as a unit and cutting away the rest.

FIG. 4B is an enlarged diagram showing a simple output example of the actual character " " according to the processes of the invention.

It should be noted in the above arithmetic operations that the digitizing conversions in (ii) are separately executed with respect to the portion serving as a reference of the horizontal line element, namely, ROUND (y[i]*rate), and the portion to decide the thickness of horizontal line element, namely, ROUND ($y_b$*rate). Both of these integer values are equalized to the correlation among the reference character data and thereafter, the addition is performed. On the other hand, a distortion of the digitization errors must be absorbed into any one of the areas to which data is output. In the present invention, this distortion is absorbed into the portion other than the horizontal or vertical line elements. As is obvious from FIGS. 4A and 4B, this is because if the distortions are absorbed into the above two elements, they will become very conspicuous but if they are absorbed in the other portions, they will be fairly inconspicuous.

In the embodiment, the bit data is developed in the VRAM 12 in the case of the display by the CRT, and the bit data is developed in the IMEM 13 in the case of outputting by the printer.

According to the invention, the horizontal and vertical line elements can be discriminated by only the merely contour coordinate point arrays of character data without needing complicated coding processes, and even after those elements were enlarged or reduced, the character data can be uniformly output. Therefore, the output section can be also applied to any device which is the means for converting digital information into a visible image. Namely, a scanning type CRT, digital pen plotter, or the like can be used.

As described above, the character processing apparatus according to the invention comprises: means for discriminating whether two continuous points in the coordinate point array constitute horizontal or vertical line elements or not on the basis of the coordinate values between these two points; and means for enlarging or reducing a thickness of the relevent horizontal or vertical line so that their thickness relation is equal to the thickness relation of reference character data if it is determined that those two points constitute the horizontal or vertical line, wherein even after completion of the enlargement or reduction, the horizontal and vertical lines can be output at the uniform thicknesses with a high quality.

I claim:

1. A character processing apparatus which processes character data as an array of coordinate points on contour lines of the character data and converts the character data into dot information and outputs the converted dot information, comprising:

discriminating means for discriminating, before the conversion of the character data into the dot information, whether or not two contour points on the coordinate point array constitute a horizontal line or a vertical line on the basis of coordinate values between the two points, and discriminating whether or not two such horizontal or vertical lines form a pair of parallel lines by testing whether or not x coordinates representing the horizontal lines or y coordinates representing the vertical lines overlap each other in part; and arithmetic operation means for, when it is determined that the two points constitute a horizontal line or a vertical line, enlarging or reducing a thickness represented by a pair of such horizontal lines or vertical lines so that the relation in thickness between two pairs of the horizontal lines or vertical lines may be equal to that between corresponding two pairs in the character data.

2. An apparatus according to claim 1, wherein said arithmetic operation means performs the reduction in accordance with a designated size while keeping the relation in thickness of the horizontal lines or vertical lines in the character data.

3. An apparatus according to claim 1, wherein said arithmetic operation means performs the enlargement in accordance with a designated size while keeping the relation in thickness of the horizontal lines or vertical lines in the character data.

4. An apparatus according to claim 1, further comprising output means for outputting dot information.

5. An apparatus according to claim 4, wherein said output means comprises a CRT.

6. An apparatus according to claim 4, wherein said output means comprises a printer.

7. An apparatus according to claim 4, wherein said output means comprises a plotter.

8. A character processing apparatus comprising:
input means for inputting size information;
memory means for storing a plurality of data representing a character,
wherein the plurality of data comprises a first data which represents the number of coordinate points for representing the character, second data which represents the number of contour lines of the character, and third data which represents a memory area in which fourth data is to be stored, wherein the fourth data represents the contour lines and further comprises fifth data representing the kinds of each coordinate point data, and, for each coordinate point, either sixth data, representing that coordinate point, or seventh data, representing distances of that coordinate point from a reference point, in accordance with the fifth data for that coordinate point; and control means for repeatedly accessing the fourth data on the basis of the first, second, and third data stored in said memory means in response to input index information and, for each coordinate point, reading the sixth data (if any) corresponding to that coordinate point in response to the fifth data or, if no sixth data is stored for that coordinate point, deriving coordinate information for that coordinate point using the seventh data for that coordinate point, wherein said control means independently derives the sixth data and the seventh data in response to the size information input by said input means.

9. An apparatus according to claim 8, wherein said control means further executes a rounding operation for the coordinate points.

10. An apparatus according to claim 8, wherein said input means inputs the size information with a pointing device.

11. An apparatus according to claim 8, further comprising output means for outputting data.

12. An apparatus according to claim 11, wherein said output means comprises a CRT.

13. An apparatus according to claim 11, wherein said output means comprises a printer.

14. An apparatus according to claim 11, wherein said output means comprises a plotter.

15. A character processing method which processes character data as an array of coordinate points on contour lines of the character data and converts the character data into dot information and outputs the converted dot information, said method comprising:

a step for discriminating, before the conversion of the character data into the dot information, whether or not two contour points on the coordinate point array constitute a horizontal line or a vertical line on the basis of coordinate values between the two points, and discriminating whether or not two such horizontal or vertical lines form a pair of parallel lines by testing whether or not x coordinates representing the horizontal lines or y coordinates representing the vertical lines overlap each other in part; and a step for, when it is determined that the two points constitute a horizontal line or a vertical line, enlarging or reducing a thickness represented by a pair of such horizontal lines or vertical lines so that the relation in thickness between two pairs of the horizontal lines or vertical lines may be equal to that between corresponding two pairs in the character data.

16. A method according to claim 15, wherein said step of enlarging or reducing performs reduction in accordance with a designated size while keeping the relation in thickness of the horizontal lines or vertical lines in the character data.

17. A method according to claim 15, wherein said step of enlarging or reducing performs enlargement in accordance with a designated size while keeping the relation in thickness of the horizontal lines or vertical lines in the character data.

18. A method according to claim 15, further comprising an outputting step for outputting dot information.

19. A method according to claim 18, wherein said outputting step outputs dot information using a CRT.

20. A method according to claim 18, wherein said outputting step outputs dot information using a printer.

21. A method according to claim 18, wherein said outputting step outputs dot information using a plotter.

22. A character processing method comprising:
a step for inputting size information;
a step for storing in memory means a plurality of data representing a character,
wherein the plurality of data comprises a first data which represents the number of coordinate points for representing the character, second data which represents the number of contour lines of the character, and third data which represents a memory area in which fourth data is to be stored, wherein the fourth data represents the contour lines and further comprises fifth data representing the kinds of each coordinate point data, and, for each coordinate point, either sixth data, representing that coordinate point, or seventh data, representing distances of that coordinate point from a reference point, in accordance with the fifth data for that coordinate point; and
a step for repeatedly accessing the fourth data on the basis of the first, second, and third data stored in the memory means in response to input index information and, for each coordinate point, reading the sixth data (if any) corresponding to that coordinate point in response to the fifth data or, if no sixth data is stored for that coordinate point, deriving coordinate information for that coordinate point using the seventh data for that coordinate point,
wherein said step for repeatedly accessing independently derives the sixth data and the seventh data in response to the size information input by said input step.

23. A method according to claim 22, wherein said step for repeatedly accessing further executes a rounding operation for the coordinate points.

24. A method according to claim 22, wherein said step for inputting size information inputs the size information with a pointing device.

25. A method according to claim 22, further comprising a step for outputting data.

26. A method according to claim 25, wherein said outputting step outputs data using a CRT.

27. A method according to claim 25, wherein said outputting step outputs data using a printer.

28. A method according to claim 25, wherein said outputting step outputs data using a plotter.

29. A character processing apparatus comprising:
memory means for storing a plurality of pieces of information representing a character pattern, wherein each of the plurality of pieces of information comprises (1) identification information (Sx, Sy) for identifying whether the piece of information represents a primary contour portion of the character pattern or a secondary contour portion accompanying such a primary contour portion, (2) if the piece of information represents such a primary contour portion, coordinate information (Cx, Cy) for representing coordinates of the primary contour portion, (3) if the piece of information represents such a secondary contour portion, reference information (Rx, Ry) for specifying coordinates of a primary contour portion to be referred to for the secondary contour portion and (4) if the piece of information represents such a secondary contour portion, distance information (Fx, Fy) for representing a distance from the primary contour portion to the secondary contour portion;
first deriving means for deriving coordinate information, of a character pattern to be output, corresponding to the coordinate information (Cx, Cy) representing the primary contour portion by executing an enlargement or reduction operation on the coordinate information (Cx, Cy) in a desired magnification in response to the identification information (Sx, Sy) stored in said memory means identifying that the piece of information represents the primary contour portion;
calculation means for executing an enlargement or reduction operation on the distance information (Fx, Fy) in the desired magnification in response to the identification information (Sx, Sy) stored in said memory means identifying that the piece of information represents the secondary contour portion;
second deriving means for deriving coordinate information, of the character pattern to be output, corresponding to the secondary contour portion by adding the distance information as enlarged or reduced by said calculation means to the coordinate information derived by said first deriving means; and
output means for converting the coordinate information derived by said first and second deriving means into dot information and for outputting the converted dot information.

30. An apparatus according to claim 29, wherein said output means comprises a display device.

31. An apparatus according to claim 29, wherein said output means comprises a printer.

32. An apparatus according to claim 29, wherein said output means comprises a plotter.

33. A character processing method comprising the steps of:
storing, in a memory, a plurality of pieces of information representing a character pattern, wherein each of the plurality of pieces of information comprises (1) identification information (Sx, Sy) for identifying whether the piece of information represents a primary contour portion of the character pattern or a secondary contour portion accompanying such a primary contour portion, (2) if the piece of information represents such a primary contour portion, coordinate information (Cx, Cy) for representing coordinates of the primary contour portion, (3) if the piece of information represents such a secondary contour portion, reference information (Rx, Ry) for specifying coordinates of a primary contour portion to be referred to for the secondary contour portion and (4) if the piece of information represents such a secondary contour portion, distance information (Fx, Fy) for representing a distance from the primary contour portion to the secondary contour portion;
a first step of deriving coordinate information, of a character pattern to be output, corresponding to the coordinate information (Cx, Cy) representing the primary contour portion by executing an enlargement or reduction operation on the coordinate information (Cx, Cy) in a desired magnification in response to the identification information (Sx, Sy) stored in the memory identifying that the piece of information represents the primary contour portion;

executing an enlargement or reduction operation on the distance information (Fx, Fy) in the desired magnification in response to the identification information (Sx, Sy) stored in the memory identifying that the piece of information represents the secondary contour portion;

a second step of deriving coordinate information, of the character pattern to be output, corresponding to the secondary contour portion by adding the distance information as enlarged or reduced in said executing step to the coordinate information derived in said first deriving step; and converting the coordinated information derived in said first and second deriving steps into dot information and outputting the converted information.

34. A method according to claim 33, wherein said converting and output step outputs the dot information using a display device.

35. A method according to clam 33, wherein said converting and output step outputs the dot information using a printer.

36. A method according to claim 33, wherein said converting and output step outputs the dot information using a plotter.

* * * * *